Patented Jan. 29, 1935

1,989,150

UNITED STATES PATENT OFFICE 1,989,150

GLUE

Gordon G. Pierson, Lansdale, Pa., assignor to Perkins Glue Company, a corporation of Delaware No Drawing. Application July 8, 1933, Serial No. 679,546

20 Claims. (Cl. 134—23.4)

This invention relates to adhesives and particularly to starch glue having the necessary strength and other properties for use in the woodworking industry.

Starch glues employed in the woodworking industries contain water as a vehicle. The old and well-known type of starch glue described in Perkins Reissue Patent #13436 employed about 2⅛ parts of water to 1 part of glue base. This glue was prepared from cassava starch. The water content of a glue is a controlling factor for glues in the woodworking industries. A water content of not over 2¼ to 2½ is imperative for trade requirements in the plywood industry. It is well recognized in the industry that the use of water as a solvent presents difficulties in the use of the resulting glues usually in proportion to the amount of water present. In fact with glues made from sago and potato the amount of water required for these glues heretofore has been so great that they have not been employed by ply-wood manufacturers. Ply-wood manufacture is the branch of the woodworking industry which employs substantially all of the starch woodworking glues.

The difficulty with excessive water is that it facilitates the penetration of the glue too deeply into the wood, thus producing weak or starved joints. Water introduced into the wood by the gluing operation is the principal factor causing warping, checking, staining, slow-setting, moulding and many other difficulties commonly known to the wood-worker. Furthermore the manufacturer of ply-wood considers it necessary or desirable to eliminate from the glued-up wood constructions, before the article is finally assembled and finished, nearly all of the water which has been added in the gluing operation. This is usually done by means of a dry kiln or by long exposure under normal room atmospheric conditions. Obviously for this reason it is desirable to introduce a minimum of water by the gluing operation. On the other hand such glues must be sufficiently fluid to be easily handled by the glue-spreading machinery and able to flow through pipes preferably by gravity to these machines. This fluidity or ability of the particles of the glue to move easily with respect to one another varies directly with the water content of the glue. Generally the lower the water content, the less fluid is the glue.

Glue made from cassava according to the Perkins reissue patent mentioned above, containing 2⅛ parts of water to 1 part base are satisfactory for the gluing of ply-wood, but they are not quick-setting glues and they do not possess the other desirable features of low water content glues. Glues heretofore made of sago or potato starch have never been made up with a water content as low as that employed for the cassava starches. In addition to this defect all glues heretofore known and made from these starches have possessed the very objectionable property of substantially losing their fluidity on standing. In an attempt to overcome this objectionable thickening action and to permit the liquid glue to be satisfactorily handled in commercial mixing, piping and spreader systems, it has been necessary to use either an excessive amount of water or caustic soda or both and it has also frequently been necessary in the case of glue from sago to keep such glue hot or warm in order to maintain sufficient fluidity for handling. In the case of glues from potato starch there has frequently been an inducement to use such glue because it is often available at prices substantially below that of cassava starch. This glue aside from it water requirements as pointed out has a bad thickening action on standing. This jellying action is minimized by the excessive proportion of water and caustic soda but when more reasonable amounts of water and caustic soda have been used, the stiffness of the jellies formed approaches those formed of high grade animal glues.

It is known in accordance with the copending applications of Ellery H. Harvey, Ser. Nos. 589,549-50, each filed September 21, 1922, and Ser. No. 615,151, filed January 26, 1923, that the water content of cassava glues could be changed by the use of barium peroxide and other oxidizing agents under certain conditions and that among others, glues which would set much more rapidly than the old glues of the Perkins reissue patent mentioned could be obtained. The cassava glues just mentioned have gone into considerable use and by speeding up the time of setting have made it possible to lessen the number of devices and pieces of machinery such as clamps, presses and the like required for a given production of veneered ply-wood or other glued wood. My work with these Harvey cassava glues, however, indicates that their water content may not be reduced satisfactorily below a certain minimum while still maintaining a satisfactory fluidity of the glue. This limit is in the neighborhood of 1.5–1.6 of water to dry glue base. When attempt is made to carry out Harvey's oxidizing process further in order to lower the water content of these cassava glues below the point just mentioned, I have found that the resulting glue is not satisfactory for practical use in existing plant machinery. In fact such further oxidation naturally tends to thicken the glue and accordingly increases the water requirements. I have found that it is possible to substitute certain inorganic finely divided fillers such as whiting for a portion of the starch in cassava glues of this type thereby permitting the glue to be mixed up with a lower water ratio. In order to reduce the water requirements of glues of this type to the neighborhood of 1.2 parts of water to 1 part of dry glue base, substantial quantities of such fillers for a like portion of the starch would be substituted, specifically 30 to 35% of whiting. However, I have found such glue containing such large quantities of inorganic filling materials to be hard on machinery tools thus prohibiting their use for many purposes. Furthermore, I have found that these glues dry out quite rapidly after they are applied to the wood, which interferes with their use in building up bales of ply-wood because the glue at the surface cannot be exposed long enough to the air without losing its moisture to an extent such that on the application of the next ply a weak bond is made.

As mentioned below, however, I have found that whiting may be satisfactorily employed in connection with the components of the composition of my invention under certain conditions.

The object of this invention accordingly is to produce a superior glue having at least the usual strength and other desired characteristics of starch glues and having substantially lower water requirements than any similar glues heretofore known, but which at the same time may be satisfactorily employed in ply-wood or similar constructions. It is also an object to produce glues of this type which will not be objectionably hard on machine tools.

The invention comprises the novel products, the specific embodiments of which are described hereinafter by way of example and in accordance with which I now prefer to practice the invention.

I have found in accordance with this invention that a urea or its equivalent in combination with an oxidizing agent such as barium peroxide permits the reduction of the water content while insuring proper fluidity or viscosity of the resulting glue. The glue base preferably contains from about 3 to about 20% urea based on the weight of the dry glue base. I have found also that when a dry glue base containing this proportion of urea together with a smaller quantity, say 0.3 to 2.5% of barium peroxide, based on the weight of the dry glue base, is converted by bursting the starch with caustic soda or heat, such converted glue mixture behaves quite differently from a mixture similarly made up without urea but which contains a filler such as whiting for reducing the water content. The proportions above mentioned will vary according to the starch employed, there being different preferred proportions as more clearly indicated below for each of the starches cassava, potato and sago. As mentioned above the mixture containing whiting tends to evaporate or to be absorbed too quickly so that the manufacture of bales of plies is impossible or at least difficult to make satisfactorily. The urea appears to retard the initial tendency of the water to leave the glue by evaporation into the air or penetration into the wood on which it is spread. This retarding influence is of such nature that in the case of cassava starch it does not overcome the quick-setting effects brought about by the smaller amount of water, but is sufficient to retard the initial evaporation of water to an extent such that the veneers need not be put under pressure in a shorter time than is required for the ordinary cassava starch glues made up to include 2⅛ parts of water to 1 of starch base. In other words the glue produced is quick-setting from the standpoint of allowing quick removal from pressure without sacrificing much, if any, of the advantage of taking the customary length of time in building up a bale of ply-wood to be placed under pressure. In the case of sago and potato starch, which have a somewhat higher content of water according to my invention, the amount of urea is ordinarily kept lower than the amount used with cassava, since these latter glues with their higher water content tend to evaporate as rapidly but do not evaporate as large a proportion of their water.

I preferably prepare a dry base, which may be stored and shipped to the consumer for conversion by the latter in which the starch, peroxide, urea, etc. is present in substantially unreacted form. The conversion comprises the addition of water to the base with sodium hydroxide. In the case of cassava starch, the caustic alkali may be omitted, but in that event it is necessary to heat the starch with water to approximately the bursting temperature thereof, that is to about 165° F.

In order that the invention may be clearly understood and that those skilled in the art may be able to carry out the same, I will describe specific methods for producing the glue. It is to be understood that these examples are illustrative and are not to be construed in a limiting sense.

*Example 1.*—In preparing the dry base I take 84.4% of cassava starch substantially free from dirt or other foreign materials and mix with it 0.5% barium peroxide, 0.1% soda ash, 5% whiting and 10% urea. The chemicals, except urea, used with the dry starch of the base are preferably used in finely divided condition. The urea is preferably employed in the form of small grains or lumps. Barium peroxide is chosen because it is a solid crystalline oxidizing salt of non-hygroscopic character and hence may be stored without absorption of water which would tend to cause conversion of the starch and decomposition of the peroxide. These substances are mixed together thoroughly and when so mixed compose a preferred glue base. This base may be shipped, as noted, to the consumer where it may be converted as follows:—to 100 parts of glue base by weight are added 120 parts of water by weight and 2¼% of sodium hydroxide calculated on the weight of the dry base taken. The mixture is then heated to 160° F. and stirred until converted. The converted glue when at the temperature of the conversion, had a viscosity of about 10,000 centipoise, and when cooled to 80° F. it had a viscosity of about 60,000 centipoise.

*Example 2.*—As another example I take 74.2% of cassava starch or flour substantially free from dirt or other foreign materials, and mix with it 0.7% of barium peroxide, 0.1% of soda ash, 10% of whiting and 15% of urea. These chemicals excepting urea are preferably used in a finely divided condition, the urea is preferably not finely divided but used in the form of small grains or lumps. This base is converted as noted above by adding to 100 parts of glue base by weight, 110 parts of water by weight and 2¼% of sodium hydroxide. The mixture is then heated to 160° F. and stirred until converted. The converted glue when at the temperature of conversion had a viscosity of about 10,000 centipoise and when cooled to 80° F. it had a viscosity of about 60,000 centipoise.

*Example 3.*—As an example employing sago starch, I employ the following:—I take 91.5% of sago starch or flour substantially free from dirt or other foreign materials and mix with it 0.4% barium peroxide, 0.1% of soda ash, 4% of whiting and 4% of urea. These chemicals excepting urea are preferably used in a finely divided condition, the urea is preferably not finely divided but used in the form of small grains or lumps. This base is converted as noted above by adding to 100 parts of glue base by weight, 160 parts of water by weight and 3 parts dry sodium hydroxide. The mixture is then heated to 160° F. and stirred until converted. The converted glue when at the temperature of conversion has a viscosity of about 10,000 centipoise and when cooled to 80° F. it has a viscosity of about 60,000 centipoise.

*Example 4.*—As another example employing sago starch, I employ the following proportions of ingredients, otherwise the process is conducted as indicated in Example 2:—81.1 parts of sago starch or flour, 10.0 parts of urea, 8.0 parts of whiting, 0.5 part of barium peroxide, 0.1 part soda ash. This is converted by addition of 130 parts of water to 100 parts of glue base and containing 3 parts of solid caustic soda. The converted glue when at the temperature of conversion has a viscosity of about 10,000 centipoise and when cooled to 80° F. it has a viscosity of about 60,000 centipoise.

It will be observed that the water contents of these sago glues vary from 1.3 to 1.6 to 1 of water. This avoids thickening action of the liquid glue without resulting in the use of excessive water and caustic soda and without keeping the liquid glue warm or hot. These glues are quick-setting glues having substantially lower water requirements than any glues hertofore made from sago starch, but which at the same time may be employed in ply-wood of similar construction requiring the usual period of exposure to the air of the applied glue without undue loss of moisture on exposure, which loss will result in an improper bond.

*Example 5.*—The manufacture of a satisfactory glue from potato starch for wood-working can be prepared as follows:—I take about 93 to about 78 parts of potato starch and mix with it about 2 to about 10 parts of urea, about 5 to about 10 parts of whiting, about 0.4 to about 2 parts of barium peroxide, about 0.1 part of sodium carbonate. These chemicals excepting urea are preferably used in a finely divided condition, the urea is preferably not finely divided but used in the form of small grains or lumps. This base is converted as indicated in Example 3 employing about 225 to about 140 parts of water and about 2 to about 3 parts of caustic soda.

Glue made from potato starch has never been used successfully in the commercial manufacture of the better grades of furniture and plywood. The two principal reasons being that, first, such glue prepared by methods previously known has required an excessive proportion of water— namely about 3 parts of water to 1 part of starch. This quantity of water would be necessary to obtain sufficient fluidity and softness to permit the proper preparation and application by machinery available for this work. Secondly, all potato starch glues previously known have possessed the property of becoming thick, pasty and lardy upon standing a short time after their preparation. This thickening action, in spite of excessive water and caustic soda which might be added to minimize it, would seriously interfere with or prevent the proper delivery of glue from the mixing equipment through pipes, and also make proper handling of the glue in the spreading equipment quite difficult. Potato starch glue prepared in accordance with my invention serves as a satisfactory substitute for cassava starch glues. Heretofore no starch glue has ever been prepared which would serve as a substitute for cassava starch glue within my knowledge. Potato starch glues as prepared above do not thicken appreciably even after standing for several days without agitation. The glue as prepared according to the above example employing potato starch is not a rapid-drying glue as compared with the quick-setting cassava and sago glues above, the principal function of the urea being to assist in making a glue with a lower water content than heretofore possible using potato starches. The converted glue when at the temperature of conversion has a viscosity of about 10,000 centipoise and when cooled to 80° F. it has a viscosity of about 60,000 centipoise.

The amount of caustic soda may be reduced by the use of carbon disulfide.

Urea acts as a liquefying and stabilizing agent. Whiting also acts as a liquefying and stabilizing agent. Barium peroxide acts as a strong liquefying agent. It is to be understood that, broadly speaking, increasing amounts of peroxides progressively reduce the water absorbing capacity of starch glues up to a certain point, after which further increases cause a thickening action to set in. This thickening or pastiness which may result from a glue containing a comparatively high percentage of active peroxide, can be prevented or reduced by keeping the temperatures as low as possible during the cooking operation, and by applying the higher temperature over the shortest possible period. These are general rules concerning the action of peroxides. Sometimes they do not apply. Different shipments or samples of the same kind of starch may react differently. Caustic is a liquefying and stabilizing agent and being especially effective as a stabilizer. Carbon disulphide is a stabilizer and has a stabilizing action equivalent to about 2% of caustic soda. I mean by the words "liquefying agent" an agent for bringing about a reduction for the viscosity or water-absorptive capacity of the glue base. By "stabilizing agent" I mean an agent for preventing or retarding thickening action in the prepared glue.

I find that if the starches employed in the above examples have a moisture content which is substantially in equilibrium with that of the atmosphere, they form glue bases, which are substantially stable on storage for an indefinite period. For cassava starch I have determined this moisture content as about 12% of the starch. Larger amounts than 12% tend to decrease the stability of the glue base somewhat on storage.

The expression "starch in substantially dry powdered form" as employed in the claims hereto appended, is intended to include starch containing a moisture content substantially in equilibrium to that of the atmosphere.

These glues when converted and applied to veneering and ply-wood have been found to reduce the checking of face veneers as also to reduce the staining thereof. They also reduce the warping of ply-wood. At the same time, particularly in the case of cassava glues, they have been found to increase the strength of the bond obtained. In the manufacture of ply-wood, cassava glue made according to this invention produces a moderately stronger average joint than can be produced with any starch glue heretofore known. Due to the fact that the cassava and sago and certain potato glues are quick-setting, the time required for holding glued-up stock under pressure is correspondingly reduced thus liberating devices and pieces of apparatus and speeding up the operations of the plant. Also due to the fact that less water is introduced into the wood by the gluing operation than is possible with any starch glues heretofore known, there is a saving in the time and expense necessary to eliminate excess moisture from the glued-up wood. Urea in these compositions is substituted for a portion of the starch. Since urea is a non-viscous highly soluble material, it permits a substantial reduction in the water requirements of the glue base. The urea also is a liquefying agent which has a tendency to liquefy or thin out starch solutions under almost all conditions. The combination of urea with barium peroxide to a certain degree intensifies the liquefying action of barium peroxide. Urea is not used primarily to enable the quantity of oxidizing agent to be reduced, but principally it is used in combination with the oxidizing agent to produce a glue having lower water requirements than any satisfactory vegetable glue heretofore produced.

The presence of whiting and soda ash are not necessary for the manufacture of this low water content glue. The whiting is a filling material which works especially smoothly and improves the spreading characteristics of the glue to some extent. It also permits the reduction of water due to the fact that it is substituted for an equivalent amount of starch in the base. The amount of whiting may vary upwards to 20%.

I find that the soda ash acts as a stabilizing agent for the action of the barium peroxide. I am unable to account theoretically for this action but it is my observation that the consistency, including viscosity, of the finished glue may be more easily controlled when small quantities of soda ash are used in conjunction with the barium peroxide. Barium peroxide may vary from about 0.3% to 2.5% based on the weight of the base. Other equivalents may be substituted for urea. I prefer to employ what is known as the "fertilizer" grade of urea, which is one of the less expensive types. Other oxidizing agents than barium peroxide may be employed. For example, an equivalent amount of hydrogen peroxide can be added to the kettle during conversion. Also an equivalent amount of sodium peroxide could be added to the kettle during conversion. I prefer not to mix a water solution of hydrogen peroxide into the dry glue base or to employ sodium peroxide as such because these oxidizing agents tend to deteriorate quite rapidly on storage. Other peroxides which are fairly stable substances and which accordingly may be used for mixing in the glue base can be used, but I ordinarily prefer to employ barium peroxide.

This application is a continuation in part of my application Ser. No. 627,465, filed August 4, 1932.

The term "water" as employed in the appended claims is intended to cover water as such or forming the solvent for caustic soda solution.

While the invention has been described in detail with respect to certain preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What I claim as new and desire to secure by Letters Patent is:—

1. A glue base consisting of a starch in substantially dry powdered form containing an oxidizing agent capable of reacting with said starch but said starch being substantially unreacted upon by said oxidizing agent, and a urea, said urea serving to render glue prepared from the base more fluid and more stable and adapted to reduce the quantity of oxidizing agent employed for a given fluidity and to retard evaporation of water from the glue after its application to an object to be glued.

2. A glue base consisting of a starch in substantially dry powdered form containing a substantially stable peroxide without being substantially reacted upon by said peroxide, and urea, said urea serving to render glue prepared from the base more fluid and more stable and adapted to reduce the quantity of peroxide employed for a given fluidity and to retard evaporation of water from the glue after its application to an object to be glued.

3. A glue base of starch selected from the group cassava, sago, or potato in substantially dry powdered form containing barium peroxide without being substantially reacted upon by said oxidizing agent, and a urea, said urea serving to render glue prepared from the base more fluid and more stable and adapted to reduce the quantity of oxidizing agent employed for a given fluidity and to retard evaporation of water from the glue after its application to an object to be glued.

4. A glue base of sago starch in substantially dry powdered form mixed with urea about 4 to about 10% by weight of the total base, and barium peroxide in the proportion of about 0.5% or less by weight of the total base.

5. A glue base consisting of cassava starch in substantially dry powdered form mixed with urea 5 to 20% by weight of the total base and barium peroxide in proportion of 0.3 to 1.0% by weight of the total base.

6. A glue base consisting of potato starch in substantially dry powdered form mixed with about 2 to about 10% urea and about 0.4 to about 2.0% of barium peroxide based on the weight of the total base.

7. A glue prepared from a base consisting of a starch in substantially dry powdered form containing an oxidizing agent capable of converting said starch, a urea, said urea being adapted to reduce the quantity of oxidizing agent employed for a given fluidity and to retard evaporation of water from the glue after its application to an object to be glued, and water in sufficient quantity to dissolve said base to form a glue adapted for gluing ply-wood, bent-wood and the like.

8. A glue containing the products of reaction of cassava starch, an oxidizing agent capable of reacting upon said starch, and a urea dissolved in water in the ratio of not more than about 1.3 parts of water to 1 part of glue base forming a glue having a viscosity of about 60,000 centipoise adapted for gluing ply-wood, bent-wood and the like.

9. A glue containing the products of reaction of cassava starch, a stable peroxide and urea dissolved in water in the ratio of not more than about 1.3 parts of water to 1 part of glue base forming a glue having a viscosity of about 60,000 centipoise adapted for gluing ply-wood, bent-wood and the like.

10. A glue containing the products of reaction of cassava starch, barium peroxide and urea dissolved in water in the ratio of not more than about 1.3 parts of water to 1 part of glue base forming a glue having a viscosity of about 60,000 centipoise adapted for gluing ply-wood, bent-wood and the like.

11. A glue containing the products of reaction of cassava starch, soda ash, whiting, barium peroxide and urea dissolved in water in the ratio of not more than about 1.3 parts of water to 1 part of glue base forming a glue having a viscosity of about 60,000 centipoise adapted for gluing ply-wood, bent-wood and the like.

12. A glue containing the products of reaction of sago starch, an oxidizing agent capable of reacting upon said starch, and a urea dissolved in water in the ratio of not more than about 1.6 parts of water to 1 part of glue base forming a glue having a viscosity of about 60,000 centipoise adapted for gluing ply-wood, bent-wood and the like.

13. A glue containing the products of reaction of potato starch, a stable peroxide, and a urea dissolved in water in the ratio of not more than about 2.25 parts of water to 1 part of glue base forming a glue having a viscosity of about 60,000 centipoise adapted for gluing ply-wood, bent-wood and the like.

14. A glue base according to claim 1 in which the moisture content is substantially in equilibrium with that of the atmosphere.

15. A glue according to claim 7 in which the starch has been converted by the addition of caustic alkali and in which a portion of the caustic alkali is replaced by carbon disulfide.

16. A glue prepared from a base consisting of a starch in substantially dry powdered form mixed with 3 to 20% urea, and 0.3 to 2.5% barium peroxide in which the starch has been converted by the addition of caustic alkali and in which a portion of said caustic alkali is replaced by carbon disulfide.

17. A glue base consisting of a starch in substantially dry powdered form containing an oxidizing agent capable of reacting upon said starch but said starch being substantially unreacted upon by said oxidizing agent, a filler and urea, said urea serving to render glue prepared from the base more fluid and more stable and adapted to reduce the quantity of oxidizing agent employed for a given fluidity and to retard evaporation of water from the glue after its application to an object to be glued.

18. A glue base of substantially unconverted cassava starch in substantially dry powdered form mixed with a urea in proportion to serve as a liquefying agent and to retard evaporation of moisture from the glue prepared therefrom, and a liquefying oxidizing agent in proportion to aid in liquefying the starch and to stabilize glue made therefrom.

19. A glue base of substantially unconverted sago starch in substantially dry powdered form mixed with a urea in proportion to serve as a liquefying agent and to retard evaporation of moisture from the glue prepared therefrom, and a liquefying oxidizing agent in proportion to aid in liquefying the starch and to stabilize glue made therefrom.

20. A glue base of substantially unconverted potato starch in substantially dry powdered form mixed with a urea in proportion to serve as a liquefying agent and to retard evaporation of moisture from the glue prepared therefrom, and a liquefying oxidizing agent in proportion to aid in liquefying the starch and to stabilize glue made therefrom.

GORDON G. PIERSON.